United States Patent [19]

Deyrup et al.

[11] Patent Number: 4,912,167

[45] Date of Patent: Mar. 27, 1990

[54] POLYESTER COMPOSITIONS FOR BLOW MOLDING

[75] Inventors: Edward J. Deyrup, Northeast, Md.; Edmund A. Flexman, Jr.; King L. Howe, both of Wilmington, Del.

[73] Assignee: E. I. Du Pont de Nemours and Company, Wilmington, Del.

[21] Appl. No.: 132,486

[22] Filed: Dec. 14, 1987

[51] Int. Cl.$^4$ .............................................. C08L 67/02
[52] U.S. Cl. .................................... 525/166; 525/176; 525/438; 524/398; 524/399
[58] Field of Search ...................... 525/176, 166, 438; 524/398, 399

[56] References Cited

U.S. PATENT DOCUMENTS

| | | | |
|---|---|---|---|
| 4,034,013 | 7/1977 | Lone | 260/835 |
| 4,246,378 | 1/1981 | Kometani et al. | 525/4 |
| 4,284,540 | 8/1981 | Iida et al. | 260/22 R |
| 4,659,757 | 4/1987 | Okamoto et al. | 523/436 |

FOREIGN PATENT DOCUMENTS 59-184251 10/1984 Japan .

OTHER PUBLICATIONS

Abstract of J52 129759-A, Oct. 31, 1977.
Abstract of J54 162750-A, Dec. 24, 1979.

*Primary Examiner*—Patricia Short

[57] ABSTRACT

A blow moldable composition of a polyester, an epoxide polymer and a source of catalytic cations.

4 Claims, No Drawings

POLYESTER COMPOSITIONS FOR BLOW MOLDING

BACKGROUND OF THE INVENTION

Polyesters that are semicrystalline, particularly poly(butylene terephthalate) and poly(ethylene terephthalate), are used extensively in many applications that require good solvent resistance and good properties at elevated temperatures. They are ordinarily processed by injection molding, but there are many components of automobiles and other systems wherein such parts are hollow and to manufacture these by injection molding is very difficult and expensive. Many such parts can conceivably be made by blow molding provided the polymer system has adequate melt strength and viscosity. Unfortunately, polyesters commonly used for injection molding have melt viscosities which are too low to make them suitable for extrusion blow molding. High molecular weight polyesters can be made by solid phase polymerization of polymers suitable for injection molding, but this operation raises the cost of the polyesters substantially. It would be desirable to have blow moldable polyester compositions made from the commercial injection moldable grades of polyesters.

The addition of conventional di- and polyepoxides and, more recently, the addition of ethylene copolymers containing glycidyl groups have been suggested for increasing the melt strength and viscosity of polyesters (see Kometani et al., U.S. Pat. No. 4,246,378). Theses solutions to the problem have improved polyesters for certain blow molding applications but have proved to be inadequate in providing materials suitable for blow molding large objects having complex cross-sections such as automobile parts.

SUMMARY OF THE INVENTION

In the instant invention the melt strengths and melt viscosities of combinations of polyesters and the aforementioned epoxy-containing toughening polymers are increased substantially by addition of small amounts of a source of cations which are catalysts for epoxide reactions. The source of the catalytic cations can be a metal salt of a hydrocarbon mono-, di-, or poly- carboxylic acid or an ionomer derived by neutralizing a carboxyl group-containing polymer. The catalytic cation is believed to accelerate reactions between the epoxide groups of the toughener and reactive end groups in the polyester. It may also promote crosslinking of the toughener through epoxide reactions. Without being bound by the above postulated reactions, it has been found that melt blends of polyester resins and epoxide-containing toughening polymers prepared in the presence of certain catalytic metal cations are readily blow moldable into relatively large and complex hollow parts exhibiting moderately high stiffness and excellent toughness. The use of the catalytic cations in the amounts recommended provides the maximum increase in melt strength and viscosity for a given amount of epoxide-containing copolymer.

The compositions are melt blends of mixtures consisting essentially of:

(a) 70-90 parts of weight of a semicrystalline polyester;

(b) 10-30 parts by weight of a copolymer containing epoxide groups; and (c) 0.01 to 3.0 parts by weight of a source of catalytic cations selected from the group consisting of metal salts of hydrocarbon mono-, di-, or poly-carboxylic acids and metal salts of organic polymers containing carboxyl groups, said cations being selected from the group consisting of $Al^{+++}$, $Cd^{++}$, $Co^{++}$, $Cu^{++}$, $Fe^{++}$, $In^{3+}$, $Mn^{++}$, $Nd^{+++}$, $Sb^{+++}$, $Sn^{++}$, and $Zn^{++}$.

These compositions have high melt strength and high melt viscosity compared to the base polyester. These properties aid in making the compositions blow moldable. The compositions are readily processible by extrusion blow molding to make hollow parts, such as containers or automotive components.

DETAILED DESCRIPTION OF THE INVENTION

The polyester resins useful as component (a) are well known in the art. The polyester resins are usually prepared by melt condensation of one or more dicarboxylic acids with one or more glycols. Usually the glycol is employed in a stoichiometric excess relative to the diacid.

Among the dicarboxylic acids suitable for preparing polyesters in accordance with the present invention are the aromatic dicarboxylic acids such as terephthalic acid, isophthalic acid, orthophthalic acid, 2,6-naphthalene dicarboxylic acid, 1,5-naphthalene dicarboxylic acid, bis(p-carboxyphenyl)methane, anthracene dicarboxylic acid, 4,4-diphenylether dicarboxylic acid; aliphatic dicarboxylic acids such as adipic acid, cycloaliphatic dicarboxylic acids such as 1,4-cyclohexane dicarboxylic acid and the like; or ester formining compounds thereof.

The glycols suitable for preparing polyesters in accordance with the present invention include aliphatic diols having 2 to 10 carbon atoms such as ethylene glycol, 1,3-propylene glycol, 1,4-butanediol, neopentyl glycol, 1,5-pentanediol, 1,6-hexanediol, decamethylene glycol, cyclohexanediol, and 1,4-cyclohexanedimethanol.

Poly(ethylene terephthalate) and poly(butylene terephthalate) are preferred with the latter being especially preferred. Blends of two or more polyesters may also be used with blends of poly(ethylene terephthalate) and poly(butylene terephthalate) being preferred.

As previously indicated, the polyesters preferred for use in this invention are prepared by melt condensation and are quite suitable for injection molding as such but not for blow molding. Typically, the melt viscosity of those polyesters would be from 4000-7000 poise at 260° C., $102 \text{ sec}^{-1}$ for poly(butylene terephthalate) and 1000-5000 poise at 270° C., $102 \text{ sec}^{-1}$ for poly(ethylene terephthalate).

The epoxide group-containing copolymers which serve as component (c) contain recurring units of the monomers:

(1) $CH_2=C(R)COOCH_2\overline{CHCH_2O}$ wherein $R=H$ or lower alkyl of 1-6 carbon atoms.

The copolymer will also contain one or more of the following (2) $CH_2=CHR$ where $R=H$, lower alkyl or phenyl (3) $CH_2=C(R_1)COOR^2$ where $R_1=H$ or lower alkyl and $R^2=$alkyl of 1-8 carbons (4) $RCOOCH=CH_2$ where $R=$lower alkyl (5) CO (carbon monoxide); and include polymers derived from monomers of class (1) with monomers of class (2) either alone or in admixture with monomers of classes (3), (4) and/or (5); and polymers derived from monomers of class (1) with monomers of class (3) either alone or in admixture with monomers of class (4).

Thus, the polymers may be dipolymers derived from one or more monomers of classes (1) and (2) of which ethylene/glycidyl methacrylate copolymers are representative. More preferred are terpolymers containing one or more monomers selected from classes (3), (4) or (5) in addition to monomers from classes (1) and (2). Examples of these terpolymers include polymers of ethylene/vinyl acetate/glycidyl methacrylate and ethylene/alkyl (meth)acrylate/glycidyl methacrylate.

The epoxide group-containing polymers may also be derived from one or more monomers of classes (1) and (3) of which methyl methacrylate/butyl acrylate/glycidyl methacrylate polymers are representative. These polymers may also contain units derived from monomers of class (4), illustrative of which is methyl methacrylate/vinyl acetate/glycidyl methacrylate terpolymer.

The concentration of monomers of class (1), the glycidyl esters, may vary from about 0.5–15% by weight, preferably 1–7% by weight, in the epoxide group-containing polymers described hereinbefore.

Olefin polymers derived from monomer classes (1) and (2) and further containing up to about 40% by weight of units derived from one or more monomers of classes (3), (4) and (5) are preferred. Especially preferred are terpolymers of ethylene containing 10–30% by weight butyl acrylate and 1–7% by weight glycidyl methacrylate.

In order to confer blow moldability and toughness to the polyester, the epoxide-containing polymer must be used in amounts of 10–30 parts by weight per 100 parts of components (a) and (b). Preferably 15–25 parts of component (b) are employed. If the epoxide content of component (b) is low, the amount of component (b) used should be on the high side of the ranges given above. Conversely, if the epoxide content of component (b) is high, less of component (b) is required. Twenty parts of a terpolymer containing about 5% by weight of glycidyl methacrylate has been found to give excellent processing in blow molding operations and good toughness in the finished molded products.

Component (c) of the present invention has been described as a source of catalytic cations. Suitable catalytic cations include $Al^{+++}$, $Cd^{++}$, $Co^{++}$, $Cu^{++}$, $Fe^{++}$, $In^{+++}$, $Mn^{++}$, $Nd^{+++}$, $Sb^{+++}$, $Sn^{++}$, and $Zn^{++}$. The concentration of catalytic cations used is critical in achieving the desired results of this invention. If the amount of cation is either too great or too small, the melt strength of the melt blend will not be adequate for good processibility by blow molding.

Compounds which can serve as a source of catalytic cations include salts of hydrocarbon mono-, or di-, or polycarboxylic acids, such as metallic salts of acetic acid, stearic acid, dimer acid and trimer acid.

Ionomers derived by reacting carboxyl group-containing polymers with a metal compound capable of neutralizing the polymer are also useful as sources of catalytic cations. The base copolymer may contain carboxylic acid groups along the main chain and optionally may have terminal acid functionality. Suitable base copolymers and ionomers derived therefrom are described in U.S. Pat. Nos. 3,264,272 and 4,187,358.

Suitable base copolymers include homopolymers of ethylene, copolymers of ethylene and higher olefins such as propylene, 1-butene or 1-hexane, or terpolymers such as EPDM and other polymers as described in U.S. Patent No. 4,026,967 which have been acid functionalized by reaction with an unsaturated carboxylic acid or anhydride.

Also included are base copolymers of ethylene and optionally, other olefins, with copolymerizable unsaturated acids or their functional derivatives such as anhydrides, or half esters of diacids, e.g. the monoethyl ester of maleic acid.

Also included are base copolymers of alkyl acrylates, alkyl methacrylates, styrene, etc. with optionally other polymerizable unsaturated monomers and polymerizable carboxylic acids, or other functional derivatives such as carboxylic acid anhydrides or half esters of diacids.

The ionomer can be produced by reacting the base copolymer with a formate, acetate, hydroxide, oxide, methoxide, carbonate, etc. of the above metals. The ionomer may also be prepared in situ during the blending operation by introducing the base copolymer along with suitable metal oxides, hydroxides, carbonates, and the like. The preformed ionomers are preferred.

The amount of the catalytic cation source to be used is from 0.01–3.0 parts by weight per 100 parts of components (a) and (b) combined. For cation sources which contain a large proportion of cation, best results are obtained by operating in the lower part of the concentration range. Conversely, cation sources low in cation should be used in larger amounts within the above range. For instance, 0.035 parts of zinc diacetate dihydrate (containing about 30% Zn) or 0.5 parts of zinc ionomer (containing about 2% Zn) each give excellent results. The $Zn^{++}$ cation is preferred and it normally is used in amounts of 0.05 to 0.5 millimols per 100 grams of components (a) and (b) combined.

The ingredients used to make the compositions of the invention are dispersed uniformly and it has been found that melt blending the ingredients, by using such equipment as a melt extruder (e.g. single screw extruders or preferably twin screw extruders) in a separate step prior to blow molding is desirable. The blended product is pelletized (i.e., the extruded strand is quenched and cut), dried and used for subsequent blow molding purposes using an extrusion blow molding machine (e.g., made by Rocheleau Inc., Hayssen Inc., etc.) and fabricated into hollow articles such as containers. The previously postulated reactions involving the epoxide groups are apparently completed during the melt blending operation as evidenced by the large increases observed in melt viscosity and melt strength for the resulting melt blend.

Other additives as are known to those familiar with polymer compounding may be included in the composition. These additives include stabilizers, antioxidants, flame retardants, reinforcing agents such as glass fiber and flake, mineral fillers, ultraviolet light stabilizers, etc. Minor amounts of other polymers can also be incorporated in the present compositions. Examples of such polymers include aromatic polyesters (polyarylates) and polycarbonates.

EXAMPLES

EXAMPLE 1:

This example illustrates the preparation of a blow molding PBT resin from poly(butylene terephthalate) (PBT), an epoxide terpolymer of ethylene, butyl acrylate and glycidyl methacrylate (E/BA/GMA or EBAGMA hereafter) and zinc acetate in low concentrations as a catalyst.

To 80 parts of poly(butylene terephthalate) (PBT) having a melt index (as measured by ASTM Method D-1238 at 240° C. using a 2160 gram weight) of 6-7 gm/10 minutes were added 20 parts of an ethylene/27% n-butyl acrylate/4.9% glycidyl methacrylate terpolymer, 0.035 parts of zinc acetate dihydrate, and 0.1 parts of tetrakis [methylene (3,5-di-tert-butyl-4-hydroxyhydrocinnamate)]methane, an antioxidant (Irganox 1010, Ciba-Geigy). The various ingredients were placed in a polyethylene bag and tumbled to mix. The resulting dry blend as melt blended on a Werner and Pfleiderer twin screw extruder having a diameter of 28 mm and a length to diameter ratio of 27.5. The screw used is a general purpose screw with vacuum capability consisting of conveying elements to convey the feed material from the feed zone to a melting zone in which the material is compressed and melting begins. A section of "kneading blocks" followed by "reverse elements" next provides high shear and pressure to further the melting and mixing processes. The reverse elements serve also to provide a melt seal following which the melt is decompressed in the section under vacuum. Following the vacuum zone, the screw recompresses the melt and passes it through kneading blocks and reverse elements which also serve as a vacuum seal for this side of the vacuum zone. The melt is then further compressed and mixed as it passes through the end of the extruder and out the die. The extruder barrel and die were set at a temperature of 240° C. and the resin extruded at a rate of 14 pounds per hour. Temperature of the melt exiting the extruder die measured at 332° C. The melt strand exiting the extruder was quenched in water and out into pellets. The pelletized product was dried in a vacuum oven set at 120° C. and purged with a slight nitrogen sweep overnight. The product had a melt viscosity, measured using a Kayeness viscometer at 270° C. and at a shear rate of 102 sec-1, of 28,000 poise, considerably higher than the melt viscosity of 4040 poise on the PBT resin used as starting material.

The dried resin was blow molded using a Hayssen blow molding machine equipped with a single screw extruder. The screw had a 2" diameter, a length to diameter ratio of 22 and a compression ratio of 3 to 1. The resin was blow molded under the following conditions.

| Extruder barrel, | zone 1, feed zone | 222° C. |
| | zone 2, transition zone | 244° C. |
| | zone 3, meteringzone | 247° C. |
| | zone 4, accumulator | 257° C. |
| | zone 5, accumulator | 258° C. |
| | zone 6, die tip | 261° C. |
| Mold temperature, | | 10° C. |

The resin was extruded at a screw speed of 33 RPM into the accumulator. Once the accumulator is filled, the parison is ejected from the accumulator with a drop time of 2.8 seconds. The resin melt exhibited good melt strength as evidenced by the appearance of the parison which was round and showed no signs of sagging, wrinkling or draping. Upon closing the mold, the part is blown with air at 60 psi. The blown part is cooled in the mold under pressure and ejected after a total cycle time of 59 seconds. The test mold yielded a hollow rigid panel measuring $10\frac{1}{2}'' \times 4\frac{1}{2}'' \times 1''$ with flat surfaces and rounded edges.

The molded part was rigid, had reasonably smooth surfaces and was tough.

EXAMPLE 2

This example illustrates the preparation of a blow molding PBT resin from PBT, E/BA/GMA terpolymer and a low concentration of a zinc ionomer resin as a catalyst.

A procedure similar to that described in Example 1 is followed except that in place of the 0.035 parts of zinc acetate dehydrate was used 0.47 parts of a zinc ionomer derived from a 90% ethylene/10% methacrylic acid copolymer in which 71% of the acid groups have been converted to the corresponding zinc salt.

The extruder barrel and die was set at a temperature of 260° C. Temperature of the polymer melt exit the extruder was 313° C. The pelletized product, quenched, cut and collected in the manner described in Example 1, had a melt viscosity, measured at 270° C. and 102 sec-1, of 28750 poise compared to a melt viscosity of 6660 poise for the PBT fed to the extruder.

The product was successfully blow molded by a procedure similar to that described under Example 1. The ejected parison was relatively smooth and the blow molded part was rigid and tough.

EXAMPLE 3

This example illustrates the preparation of a blow molding poly(ethylene terephthalate) (PET) resin from PET, E/BA/GMA terpolymer and a low concentration of a zinc ionomer resin as a catalyst.

A procedure substantially identical to that described in Example 2 is followed except that in place of the PBT, poly(ethylene terephthalate) (PET) (Goodyear 7202) with an inherent viscosity of 0.72 was used.

The melt blending extruder barrel and die were set at the following temperatures:

| Two rear zones: | 255° C. |
| Middle zone | 265° C. |
| Two front zones | 270° C. |
| Die | 280° C. |
| Extruder RPM | 130 |

Temperature of the polymer melt exit the extruder was 305° C. The pelletized product, quenched, cut and collected in the manner described in Example 1, had a melt viscosity, measured at the 270° C. and 102 sec-1, of 21830 poise compared to only 1530 poise for the PET used as starting material.

The product was blow molded by a procedure similar to that described in Example 1 but with the extruder barrel and accumulator temperature set at 260° C. The molded part had thinner walls than that obtained in Example 2, but was rigid and tough.

EXAMPLE 4

This example illustrates the preparation of a blow molding PBT resin from PBT, E/BA/GMA terpolymer and a low concentration of stannous octoate as a catalyst.

A procedure similar to that described in Example 1 is followed except that in place of the 0.035 parts of zinc acetate dihydrate was used 0.05 parts of stannous octoate.

The extruder barrel and die was set at a temperature of 260° C. Temperature of the polymer melt exit the extruder was 300° C. The pelletized product, quenched, cut and collected in the manner described in Example 1, had a melt viscosity, measured at 260° C. and 102 sec-1, of 21890 poise compared to a melt viscosity of 6660 poise on the PBT fed to the extruder. (The melt viscosity value of 21890 poise is indicative of good melt strength and processibility in blow molding.)

Examples 5-8 and Comparisons 1 and 2

Additional examples and comparisons are summarized in the following table. In each case, 80 parts PBT and 20 parts EBAGMA terpolymer were used with the catalysts indicated in the table. The results show the variation of product melt viscosity with the various catalysts used:

| Example or Comparison | PBT | Catalyst | Product Melt Visc 260° C., 102 sec-1. |
|---|---|---|---|
| Example 5 | (A) | 0.035 parts stannous octoate | 25330 |
| Comp 1 | (A) | No catalyst added | 8680 |
| Comp 2 | (A) | 1% sodium ionomer (B) | 8820 |
| Example 6 | (A) | 1% zinc ionomer (C) | 20550 |
| Example 7 | (A) | 3% zinc ionomer (C) | 15880 |
| Example 8 | (A) | 5% zinc ionomer (C) | 11880 |

Footnotes:
(A) PBT with a melt viscosity at 260° C. and 97 sec-1 of 6660 poise.
(B) a sodium ionomer derived from an ethylene/22.5 n-butyl acrylate/8.6% methacrylic acid terpolymer in which 55% of the acid groups have been converted to the corresponding sodium salt.
(C) zinc ionomer derived from a 90% ethylene/10% methacrylc acid copolymer in which 71% of the acid groups have been converted to the corresponding zinc salt.
Comments:
Example 5 shows that stannous octoate is an effective catalyst or upgrading melt viscosity.
Comparisons 1 and 2 show that no catalyst (comp 1) or a sodium ionomer (comp. 2) is relatively ineffective.
Examples 6 to 8 show that zinc ionomer concentration should preferably be below 3% and more preferably below 1% in view of the melt viscosity of 28750 poise obtained with 0.47% zinc ionomer in Example 2.

We claim:

1. A melt-blend of a mixture consisting essentially of:
   (a) 70-90 parts by weight of a semicrystalline polyester;
   (b) 10-30 parts by weight of an epoxide-group containing copolymer containing recurring units of monomer of the formula (1) $CH_2=C(R)COOCH_2\overline{CH}CH_2O$ wherein R=H or lower alkyl of 1-6 carbon atoms and recurring units of one or more monomers selected from the group consisting of (2) $CH_2=CHR$ where R=H, lower alkyl, or phenyl, (3) $CH_2=C(R^1)COOR^2$ where $R^1$=H or lower alkyl and $R^2$=alkyl of 1-8 carbon atoms, (4) $RCOOCH=CH_2$ where R=lower alkyl, and (5) CO; and
   (c) 0.01 to 3.0 parts by weight of a source of catalytic cartons selected from the group consisting of metal salts of hydrocarbon mono-, di-, or poly-carboxylic acids and metal salts of organic polymers containing carboxyl groups, said cations being selected from the group consisting of $Al^{30}{}^{++}$, $Cd^{++}$, $Co^{++}$, $Cu^{++}$, $Fe^{++}$, $In^{+++}$, $Mn^{++}$, $Nd^{+++}$, $Sb^{+++}$, $Sn^{++}$, and $Zn^{++}$ and provided that the source of catalytic cations imparts into the melt blend 0.05 to 0.5 millimoles of catalytic cation per 100 grams of components (a) and (b) combined.

2. The composition of claim 1 wherein the polyester is poly(ethylene terephthalate) or poly(butylene terephthalate).

3. The composition of claim 1 wherein the source of the catalytic cations in component (c) is the zinc salt of a carboxyl containing organic polymer.

4. A composition of claim 1 where component (a) is poly(butylene terephthalate, component (b) is a terpolymer of ethylene/butyl acrylate/glycidyl methacrylate and component (c) is the zinc salt of a copolymer of ethylene and copolymerizable unsaturated acids.

* * * * *

UNITED STATES PATENT OFFICE
CERTIFICATE OF CORRECTION

PATENT NO. : 4,912,167

DATED : March 27, 1990

INVENTOR(S) : E. J. Deyrup/E. A. Flexman, Jr./K. L. Howe

It is certified that error appears in the above-identified patent and that said Letters Patent is hereby corrected as shown below:

In the Claims:
In Claim 1:
  Column 8, Section (c), line 17, delete "cartons" and insert therefor --cations--.

Column 8, Section (c), line 21, delete "$Al^{30++}$" and insert therefor --$Al^{+++}$--

Signed and Sealed this

Twenty-ninth Day of January, 1991

Attest:

HARRY F. MANBECK, JR.

*Attesting Officer*     *Commissioner of Patents and Trademarks*